Sept. 12, 1967 E. E. OLSON 3,340,995
CONTINUOUS STABILIZATION SYSTEM
Filed Sept. 13, 1966 5 Sheets-Sheet 1

INVENTOR.
Elmer E. Olson,
BY Parker & Carter
ATTORNEYS.

Sept. 12, 1967 E. E. OLSON 3,340,995
CONTINUOUS STABILIZATION SYSTEM
Filed Sept. 13, 1966 5 Sheets-Sheet 3

INVENTOR.
Elmer E. Olson,
BY Parker & Carter
ATTORNEYS.

INVENTOR.
Elmer E. Olson,
BY Parker & Carter
ATTORNEYS.

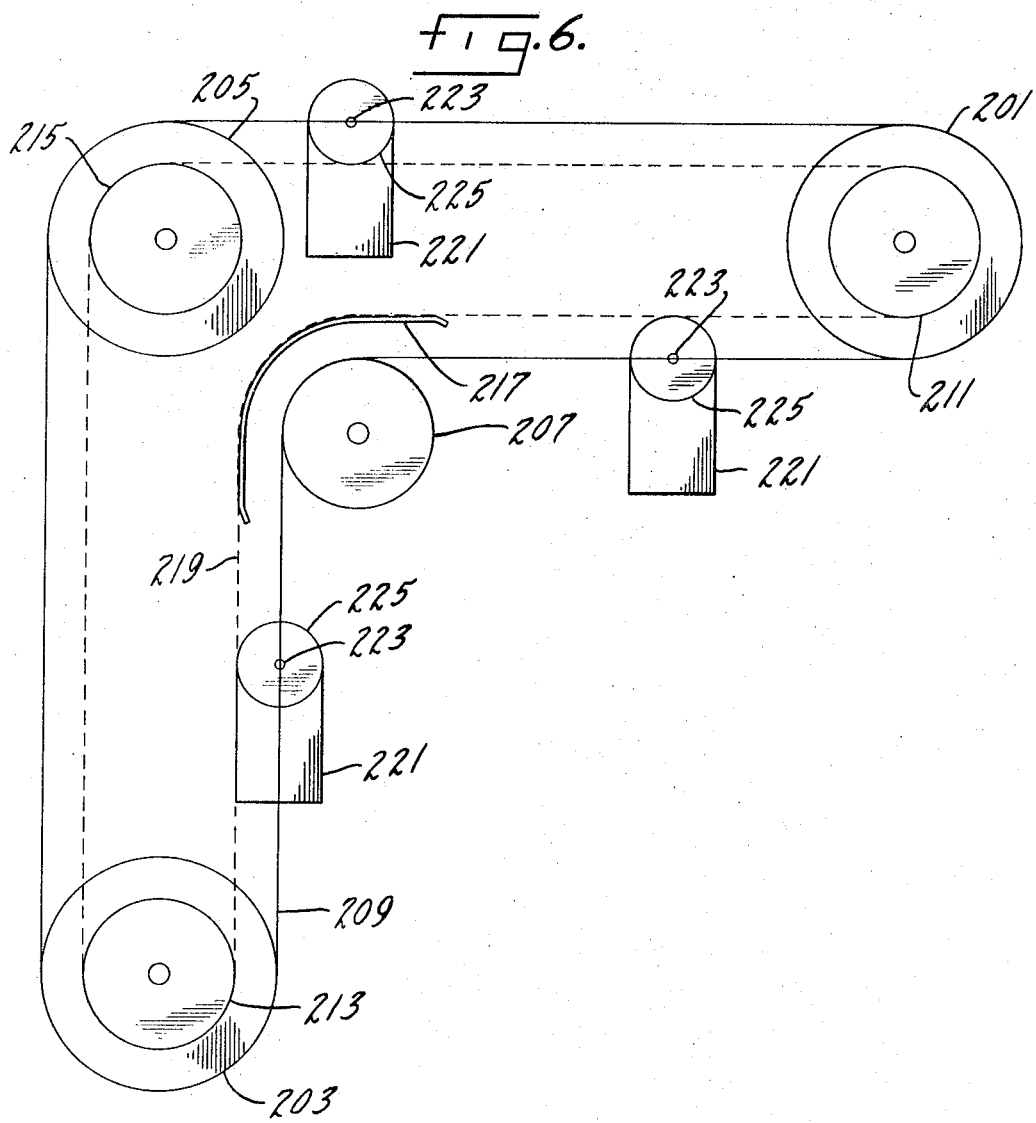

United States Patent Office 3,340,995
Patented Sept. 12, 1967

3,340,995
CONTINUOUS STABILIZATION SYSTEM
Elmer E. Olson, Nashotah, Wis., assignor to G. B. Lewis Company, Watertown, Wis., a corporation of Wisconsin
Filed Sept. 13, 1966, Ser. No. 586,908
17 Claims. (Cl. 198—158)

ABSTRACT OF THE DISCLOSURE

An endless conveyor having carriers pivotally supported between spaced sprocket chains which are rotatably driven around a set of upper and lower conveyor sprockets. A stabilization system for the carriers which includes a set of upper and a set of lower stabilization sprockets, stabilization chains mounted for movement about the stabilization sprockets and a carrier sprocket non-rotatably fixed to each end of each carrier and adapted to mesh with the stabilization chains to maintain the carriers level in transit about the conveyor. The stabilization chains are double tracked with one track engaging the stabilization sprockets and the other track engaging the carrier sprockets. The conveyor and stabilization chains move at the same linear speed but at different angular speeds around their sprockets. The conveyor and stabilization sprockets are of different diameters and the diameter of the carrier sprocket is equal to this difference in diameter.

---

This is a continuation-in-part of my copending application Ser. No. 452,223, filed Apr. 30, 1965, now abandoned.

This invention relates to endless conveyors with a stabilization system for maintaining carriers level during arcuate passage.

A primary object of this invention is a stabilization system for endless conveyors which will efficiently operate in essentially the same way to stabilize the passage of carriers around the conveyor sprockets positioned at opposite ends of the endless conveyor as well as intermediate the ends thereof.

Another object is a stabilization system for an endless conveyor in which a small number of elements may be used to maintain the system stable over extended periods of use with a lessened likelihood of breakdown.

Another object is a stabilization system which will permit various conveyor constructions by allowing a stabilization system to be separately driven and also to be indirectly driven by the conveyor drive.

Another object is an endless conveyor in which the path of the carriers is stabilized around spaced sprockets by an economical and efficient set of stabilization chains and stabilization sprockets which coact with fixed sprockets on the carriers.

Another object is an endless conveyor with a stabilization system which turns carriers between conveyor chains a predetermined amount around both sets of conveyor sprockets at opposite ends of the conveyor to maintain such carriers subtsantially level.

Another object is an endless conveyor with a stabilization system in which an endless stabilization chain moves at the same speed as a conveyor chain in linear travel but moves at a different speed in arcuate travel which speed differential is utilized to turn and hold a carrier substantially level in its arcuate path around the conveyor sprocket.

Another object is an endless conveyor with endless stabilization chains which are turned by sprockets but still provide unimpeded means for meshing with a fixed gear on a carrier so that said carrier is stabilized in its arcuate passage.

Another object is an endless conveyor with a stabilization system which is simply and economically driven by indirect coaction with the drive conveyor system.

Another object is an endless conveyor with stationary elements on opposite sides positioned so that bearing contact is made with the carriers, and said carriers can then economically drive stabilization chains by oppositely directed contact with said stationary elements.

Another object is an endless conveyor stabilization system which may be adapted to an endless conveyor which travels both vertically and horizontally.

The foregoing objects are attained as well as other objects which will become apparent from the following disclosure which includes drawings, wherein:

FIGURE 6 is a schematic view of an L-shaped endless conveyor with a continuous stabilization system.

Figure 1:
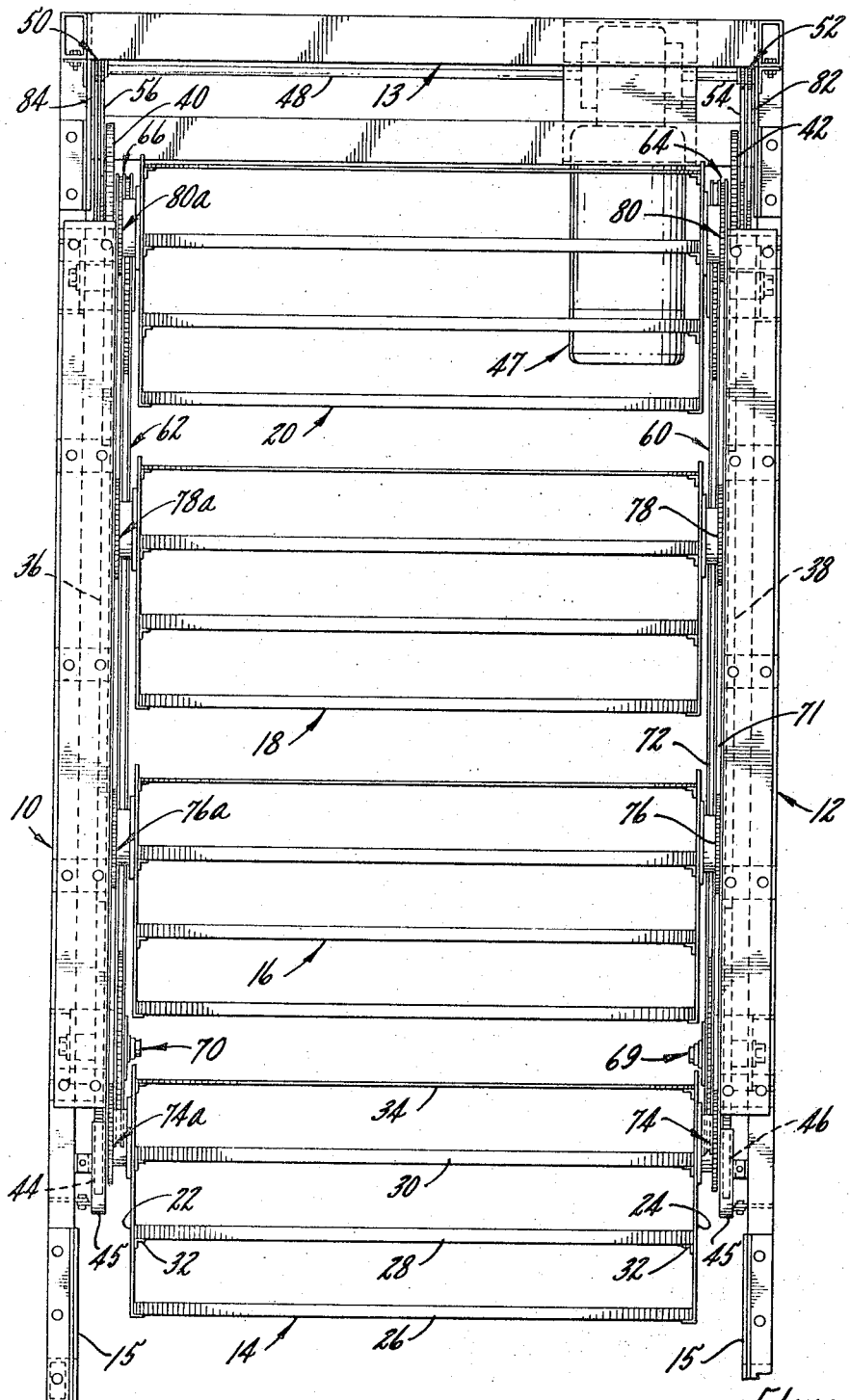
FIGURE 1 is a front elevational view of an endless conveyor with a continuous stabilization system.

FIGURE 1 shows a type of endless conveyor which may be combined with the continuous stabilization system to be disclosed. Such conveyor is shown with spaced side frames shown generally as 10 and 12 and a top crossbrace shown generally as 13. Each side frame is shown joined to a base or appropriate support such as 15.

A plurality of carriers are seen suspended between the frames and these carriers are herein shown as multiple shelf carrier units such as 14, 16, 18 and 20. Each unit such as 14 has opposed end walls 22 and 24 between which extend a plurality of shelves such as 26, 28 and 30. The shelves may be connected to the end walls by an appropriate means and may be further supported by angles such as 32. The carrier units are also shown as having a top connecting member 34 which may be used to impart rigidity to the carrier unit or to better position containers or the like placed on the underlying shelf.

Each carrier unit is connected to opposed endless conveyor chains 36 and 38. The carrier units are pivotally connected to and are carried by such conveyor chains in up and down linear travel at the front and back of the conveyor, and in arcuate travel around the top and bottom of the conveyor. Endless conveyor chains are turned around a pair or set of upper spaced sprockets 40 and 42 and a lower pair or set of conveyor sprockets 44 and 46. An arcuate guard 45 is shown positioned below the lower set of conveyor sprockets. The upper and lower sets of sprockets are rotatably mounted on the frame by conventional means.

A motor means shown generally as 47 is provided to drive the conveyor sprockets which, in the illustrated embodiment, is seen to include a drive shaft 48 having fixed sprockets at opposed ends shown generally as 50 and 52. The fixed sprockets turn driving chains 54, 56 which turn the conveyor sprockets 40, 42 at a selected speed.

The unit carriers are prevented from rocking or swinging in an undesirable manner by the coaction of a stabilization system which includes spaced stabilization chain assemblies shown generally as 60 and 62 which are driven at a selected speed around an upper set of stabilization sprockets indicated generally at 64 and at 66, and around a lower set of stabilization sprockets indicated generally at 69 and at 70.

The stabilization sprockets are shown as being concentric with the conveyor sprockets. Each stabilization chain assembly is shown as a double connected or double strand sprocket chain with parts 71 and 72 such as in system 60. One part of said double connected or double strand stabilizaiton chain is engaged by and rotates around adjoining upper and lower stabilization sprockets. The other part of said double connected or double strand stabilization chain turns unimpeded along with such stabilization sprockets so that it can be engaged by carrier sprockets such as 74, 76, 78 or 80 on one end wall, and 74a, 76a, 78a or 80a on the opposed end wall. These carrier sprockets are non-rotatably fixed to the end walls of the unit carriers.

In the embodiment of FIGURE 1, the stabilization systems are separately driven by driving chains 82 and 84 which are separately geared on shaft 48. Since the sets of stabilization sprockets are smaller than the sets of conveyor sprockets, it is necessary to differentially drive the stabilization sprockets so that the speed of the stabilization system along its linear transit is equal to the speed of the conveyor chain during the linear transit. While the speeds of such chains in linear transit are equal, they will be different in arcuate transit around the sprockets, which differential will enable the unit carriers to remain level in arcuate passage, as will be more fully described.

Figure 2:
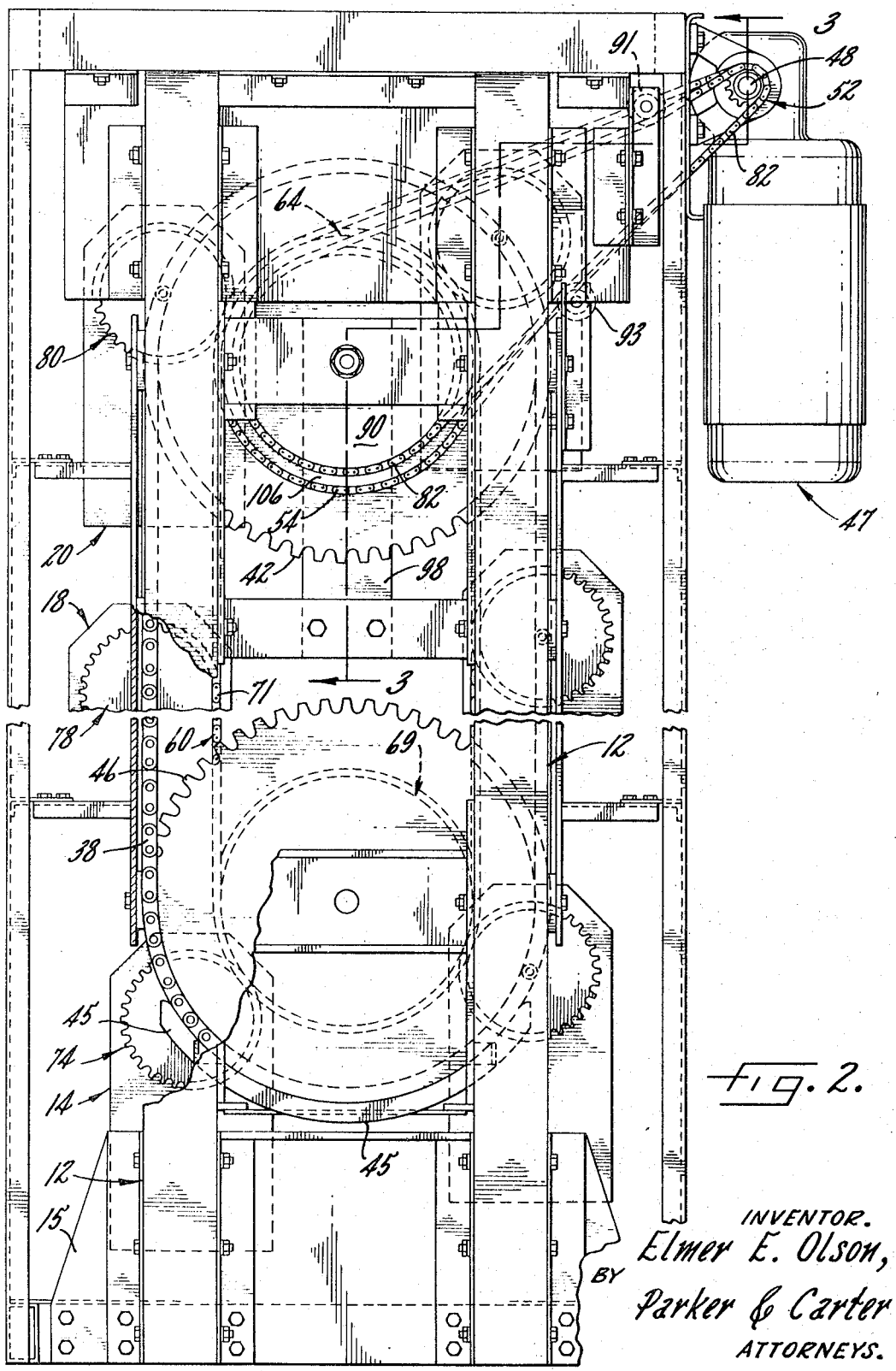
FIGURE 2 is a side elevational view, on an enlarged scale, with parts removed showing one form to operate the stabilization system.
Figure 3:
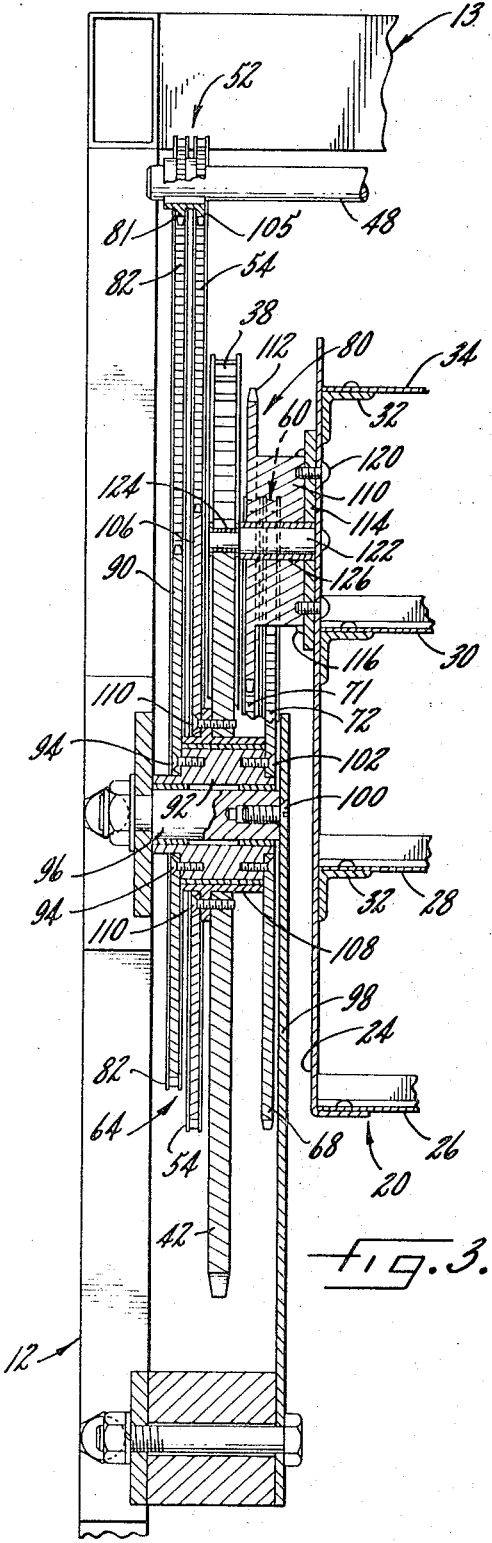
FIGURE 3 is a sectional view along line 3—3 of FIGURE 2.

Referring to FIGURES 2 and 3 there are described further details of a stabilization system which is directly driven by a drive chain 82. The chain 82 is driven by sprocket 81 on a twin sprocket sleeve which is fixed to the rotating shaft 48. Chain 82 may have its tension adjusted by repositioning idler sprocket 91 and chain 54 may have its tension adjusted by repositioning idler sprocket 93. The chain 82 turns transmission sprocket 90 which is fixed to annular bearing 92 by means such as a screw 94. The bearing is adapted to turn around stub shaft 96 which is fixed to portion 98 of the frame by means such as screw 100. Stabilizer sprocket 68 is also fixed to annular bearing 92 by means such as screw 102. Thus, transmission sprocket 90 turns stabilizer sprocket 68 at a selected speed so that the double stabilization chains 60 move in their linear or vertical path at the same speed as conveyor chain 38.

Another drive chain 54 is turned by other sprocket 105 of the twin sprocket sleeve. This chain drives transmission plate 106 which is fixed to bearing 108 by means such as a screw 110. This screw also connects plate 106 and bearing 108 to conveyor sprocket 42. Thus, drive chain 54 turns the conveyor sprocket at a desired speed so that conveyor chain 38 turns in its linear or vertical path at the same speed as double stabilizer chain systems 60 and 62.

Looking at FIGURE 3, carrier sprocket 80 is seen as having an integral body portion 110 and flange 112 to engage chain 71 in the double stabilizing chain system 60. A plate 114 is seen fixed to the body section by a weld or the like 116 and the carrier sprocket is rigidly fixed to the end wall 24 of the carrier unit 20 by bolts such as 120. The carrier unit is of course pivotally connected to the conveyor chain 38 by means which are illustrated as a fixed pivot 122 connected to link 124 of the conveyor chain, said pin serving as a fixed pivot for bearing sleeve 126 which is fixed to the body 110 of the carrier sprocket.

Figure 5:
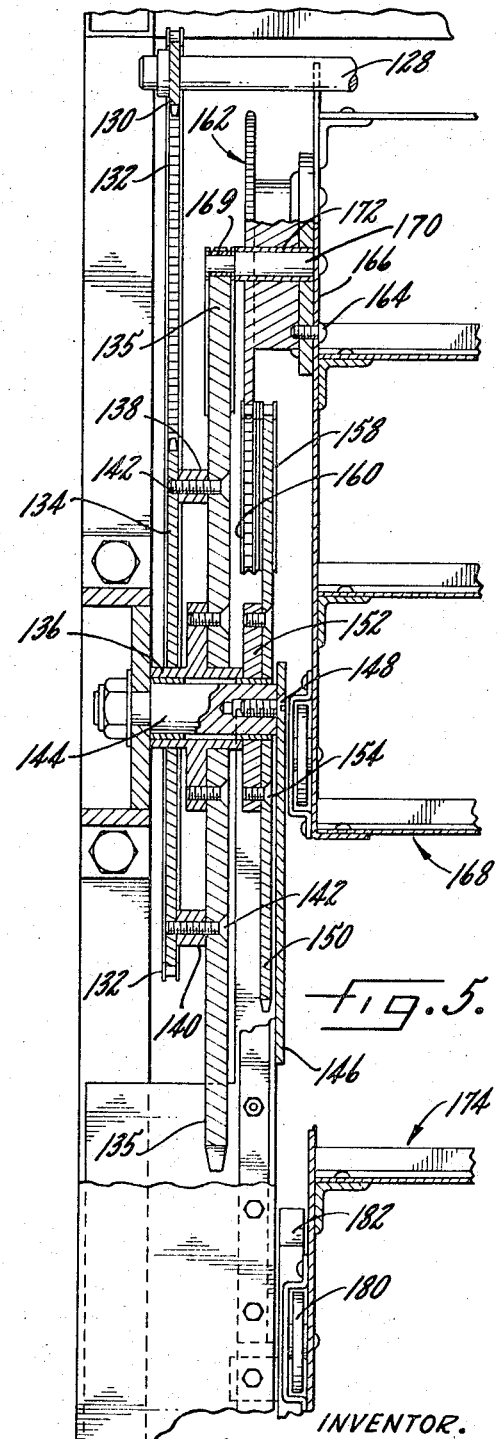
FIGURE 5 is a sectional view taken along line 5—5 of FIGURE 4.
Figure 4:
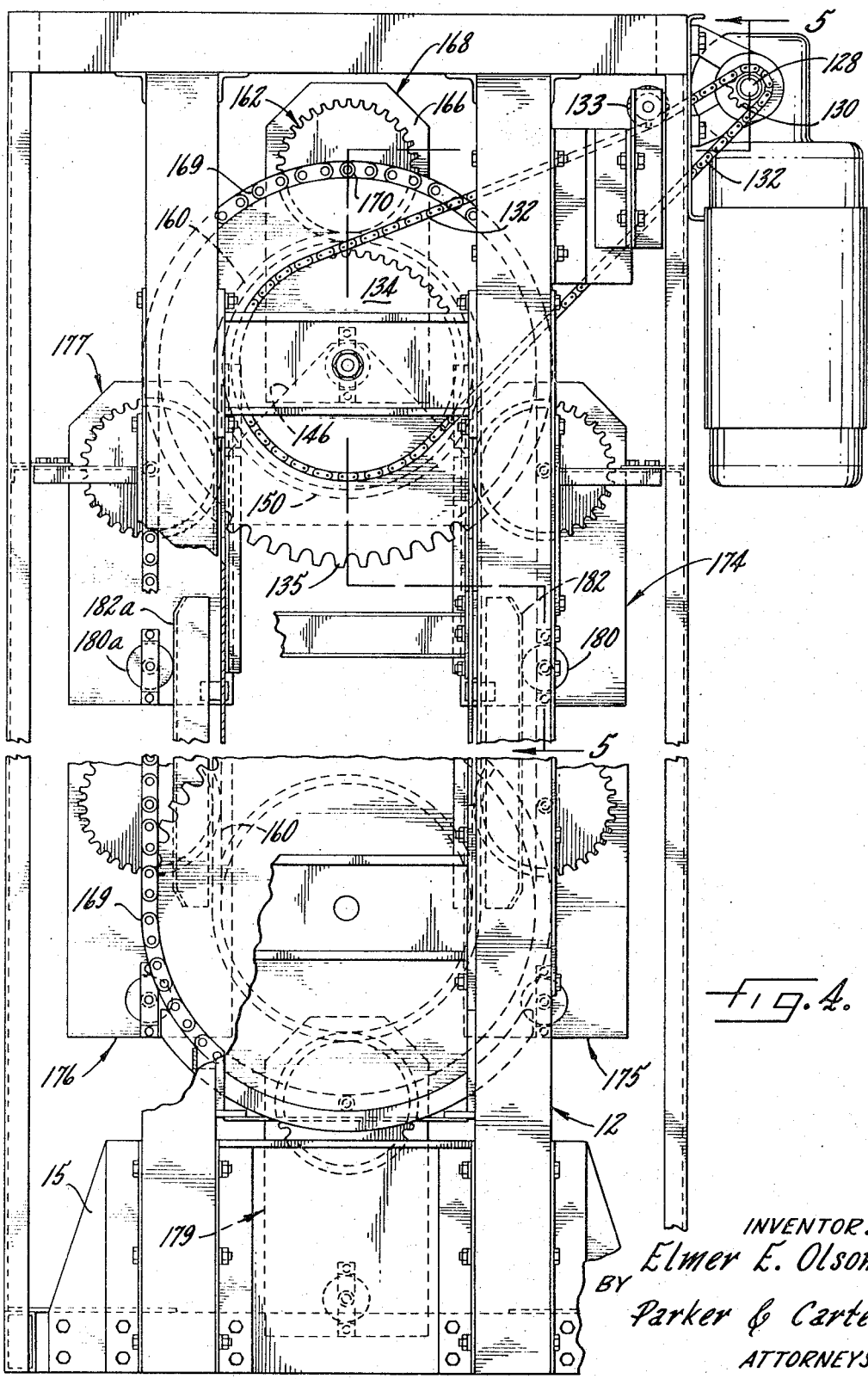
FIGURE 4 is a side elevational view, on an enlarged scale, with parts removed showing another form to operate the stabilization system.

Referring to FIGURES 4 and 5, an alternative form is shown for indirectly driving the stabilization system, that is, a form in which a separate drive chain and transmission plate is not required. On shaft 128 a single sprocket 130 turns drive chain 132 which turns transmission plate 134. Chain 132 may have its tension adjusted by repositioning idler sprocket 133. Plate 134 rotates freely over bearing sleeve 136, but it is connected to conveyor sprocket 135 through spacers 138, 140 and screws such as 142. Transmission plate 134 and conveyor sprocket 135, together with bearing sleeve 136, turn around a stub shaft 144 which is connected to portion 146 of the frame by suitable means such as a screw 148. Rotatably positioned on the stub shaft is a stabilizer sprocket 150 which is connected to spacer plate 152 by means such as screws 154. The stabilizer sprocket turns stabilization chain 158 which simultaneously turns stabilization chain 160 connected thereto. Chain 160 engages the teeth of carrier sprocket, shown generally as 162, which is rigidly connected by bolts such as 164 to end wall 166 of unit carrier designated generally as 168. The carrier is pivotally connected to conveyor chain 169 by pivot pin 170 around which carrier sprocket and its rigidly attached carrier 168 swivel as a unit by engagement through bearing sleeve 172.

In this embodiment, the drive chain 132 moves the conveyor chain 169 in an endless path and, also, indirectly drives the stabilization system. This is accomplished by conveyor chain 169 moving unit carriers such as 174, 175, 176 (FIGURE 4) so that the rigidly secured carrier sprockets engage stabilization chain 160. The carrier sprockets will drive said stabilization chain during linear transit both in front of the conveyor during upward passage, for example, and behind the conveyor during downward passage. The rigidly fixed sprocket carriers impart driving force to the stabilization chain 160 through the coaction of roller 180 engaging track 182 through its length on one side, and through the coaction of roller 180a and track 182 on the other side.

Engagement of the roller against the track presents a working face against which the carrier as a unit sets itself in order to impart driving force to the stabilization chain 160. The rigidly secured carrier sprockets do not drive the chain when their carriers are in arcuate passage at the opposed ends of the conveyor, for example, unit carriers 168 and 179 which are shown respectively at the top and bottom of the conveyor.

This embodiment has particular advantage in conveyors of smaller size but can be adapted to conveyors of wide variations in size. The adaptability of this drive system is not critically related to any particular conveyor size, but it will be understood that a direct drive for the stabilization system will be preferred for large conveyors or conveyors designed to carry very heavy loads. The practitioner will easily determine if one system is preferred for a particular design or if both would be suitable.

An L-shaped endless conveyor is shown in FIGURE 6 and includes pairs of spaced conveyor sprockets 201 and 203 located at opposite ends thereof and pairs of spaced conveyor sprockets 205 and 207 located between the end conveyor sprockets for carrying the spaced conveyor chains 209. Conveyor sprockets 207 are positioned at the inside curve of the L-shaped conveyor and are smaller in diameter than the other conveyor sprockets.

Stabilization means are provided for each conveyor sprocket. These means include stabilization sprockets 211 and 213 located respectively at the ends of the conveyor and stabilization sprockets 215 and stabilization chain guides 217 located intermediate the ends of the conveyor. Stabilization chain guide 217 has a radius larger than the radius of the stabilization sprockets and equal to the radius of the larger conveyor sprockets such as the end sprockets. The stabilization sprockets are the same size as the conveyor sprockets 207. Spaced stabilization chains 219 wind around the stabilization sprockets and chain guides. Carrier units 221 are pivotally connected to the conveyor chains 209 at 223 and each carrier unit is equipped with a rigidly connected carrier sprocket 225 at each end which sprockets engage the stabilization chains 219 to maintain stability of the carriers during arcuate movement about the sprockets of the L-shaped conveyor. The carrier units are maintained stable in arcuate travel about both the end and intermediate conveyor sprockets since the radius of a carrier sprocket is equal to the difference between the radius of the conveyor sprocket and the radius of a stabilization sprocket or stabilization chain guide whether the conveyor sprocket is larger as at the ends of the conveyor or whether the stabilization chain guide is larger as at the inside of the curve of the L- shaped conveyor. Although no driving means is shown for the L-shaped conveyor shown in FIGURE 6, it should be understood that this conveyor may be driven in the same manner as either the conveyors of FIGURE 2 or the conveyor of FIGURE 4.

The use and operation of my invention are as follows:

The single stabilization system disclosed herein operates to effectively prevent the unit carriers from swinging during arcuate passage around both the upper sprockets and the lower sprockets. The continuous stabilization chain system is driven at a speed which has a predetermined ratio to the speed of the conveyor chain which carries the carrier units. This ratio need only establish that the stabilization and conveyor chains move at the same speed in their linear transit on both sides of the endless conveyors. It is clear that a varying speed at such places would not permit the unit carriers to be carried at a level position because the differential speed would rotate the rigidly fixed sprocket carrier and thereby the unit carrier attached thereto.

When the unit carriers move around the upper and lower conveyor sprockets, the speed of the stabilization conveyor chains will assume a predetermined differential. This will occur because the stabilization sprocket is smaller than the conveyor sprocket, and the stabilization chain turning around the stabilization sprocket will therefore move at a greater speed than the conveyor chain around the conveyor sprocket. This differential will desirably rotate the carrier sprocket and the carrier rigidly connected thereto, to a selected degree so that the carrier unit is maintained level in its arcuate passage.

Looking at FIGURE 4, unit carrier 174 will not rotate relative to the principal planes of the conveyor, but such level arcuate transit is attained by rotating the carrier a predetermined amount relative to the stabilization sprocket. In this sense the carrier will continuously rotate clockwise as it begins its arcuate passage up and around the top of the conveyor. The degree of rotation will continuously increase until the arcuate passage is completed. Until the unit carrier 174 reaches top dead center, indicated by position of carrier 168, it is rotated inwardly; and after it reaches top dead center, it is continuously rotated outwardly until it completes its passage as indicated by the position of unit carrier 177.

Without the stabilization system, the unit carriers would freely rotate in their arcuate passage because of their pivotal connection to the conveyor chain. With the stabilization system, the unit carriers rotate but are positively guided in their rotation to a predetermined amount by the engagement of the carrier sprockets with the stabilization chain. The predetermined rotation of the carrier at both ends of the conveyor is established by providing that the effective circumferential engagement of a carrier sprocket such as 162 is equal to the difference in the effective circumferential engagement of a conveyor sprocket such as 135 and a stabilization sprocket such as 150. This "effective circumferential engagement" may be expressed in different ways, for example, in terms of the number of sprocket teeth on the various sprockets. In this manner, the number of sprocket teeth on the carrier would be equal to the difference in the number of teeth on the stabilization sprocket and the conveyor sprocket.

Another way would be to relate the circumferential engagement of the carrier sprocket to the difference in length of the conveyor chain and the stabilization chain. In another way the pitch diameter of the carrier sprocket can be taken as the difference in the pitch diameter of the conveyor and stabilization sprockets, but this is not always operable. The conveyor chain will preferably be heavier because of its load carrying requirements than the stabilization chain upon which lower demands are made. This will understandably affect the pitch diameter. In any event, when reference is made to the "effective circumferential engagement" or to the "effective circumferential meshing surfaces" of the various sprockets it is intended to mean such a relationship between the conveyor and stabilization sprockets, on one hand, and the carrier sprocket, on the other hand, that said carrier sprocket will rotate a predetermined amount. This will cause the carrier or equivalent unit attached thereto to rotate in a desirable manner in its arcuate passage around the sprockets.

The driving means for the stabilization system has been shown in one form to be a separate driving chain to directly drive the stabilization sprocket. This driving chain may be powered by the same shaft which powers the driving shaft for the conveyor sprocket, but the smaller length of this separate driving chain will allow the stabilization sprocket to be driven so that the stabilization chain moves at the same linear speed as the conveyor chain during linear transit. It is required that the stabilization chain be driven independently of the conveyor sprocket in the sense that it is not turned by being joined to said conveyor sprocket.

In certain embodiments, it may be preferred to turn the stabilization sprocket indirectly by the form disclosed in FIGURES 4 and 5. Here, a track extends substantially along the entire linear length of the endless conveyor on both sides of said conveyor. Said track operates as a stationary element in order to create a drive from the conveyor chain to the stabilizing chain, and the roller or coacting bearing means on the carrier prevents the carrier from turning or deflecting in one lateral direction on one side of the conveyor, and from turning or deflecting in the other lateral direction on the other side of the conveyor.

In this assembly, the rigidly fixed sprocket carriers drive the stabilizing chain during linear transit and the swing of the unit carriers is effectively prevented in both lateral directions. When the unit carrier begins its arcuate passage around either the top or bottom of the conveyor, the rigidly fixed sprocket carrier no longer operates to transmit the driving force in the stabilization chain but, on the contrary, the stabilization chain exerts an effect on the rigidly fixed carrier sprocket by rotating said sprocket a predetermined amount.

Assuming that the conveyor chain 169 is moving counterclockwise as viewed in FIGURE 4, unit carrier 177 will be moving downwardly on the front of the conveyor and its sprocket will be engaging the stabilization chain 160 to drive it downwardly. The interaction between the sprocket and the stabilization chain will result in a force couple urging roller 180a into contact with rail 182a to prevent rotation of the carrier 177 and to drive the stabilization chain along with the carrier. Upon movement of the conveyor chain 169 in a clockwise direction as viewed in FIGURE 4, the carrier 174, through its sprocket, roller 180 and rail 182 will drive the stabilization chain in a clockwise direction. Thus, when the conveyor chain is driven in one direction, the stabilization chain is driven only on one side of the conveyor and when it is driven in the opposite direction, the stabilization chain is driven by a carrier on the opposite side of the conveyor. If it is desirable to drive the stabilization chain on both sides of the conveyor during movement of the conveyor chain in either direction, it would be necessary to provide rails on both sides of each roller but this is not shown.

It will be appreciated that various stabilization patterns could be devised, if desired, by varying the length of the conveyors and the sizes of the various stabilization and conveyor sprockets. A relationship will still hold true because there will be a differential in the speed of the stabilization and conveyor chains in the arcuate passages, and there will be a difference in the effective circumferential engagement of the stabilization and conveyor sprockets. Under such operative conditions, various degrees of carrier rotation could be attained to serve a particular purpose.

While reference has been made to a preferred endless conveyor which is upright and has sets of sprockets at opposed ends of equal size, other variations are possible. The conveyor can be made horizontal, and carriers with rigidly fixed carrier sprockets can be turned in a predetermined way around the arcuate route at the opposed ends. Likewise, it is not necessary that a straight line connect the axis of the opposed sets of sprockets, but any endless conveyor could be designed having an intermediate set of sprockets to provide an angular endless conveyor. Nonetheless, the stabilization system would operate because at the opposed ends of the conveyor the stabilization sprockets, rigidly fixed to the unit carriers, would have a desired effective circumferential engagement.

FIGURE 6 shows a stabilization system adapted to an L-shaped endless conveyor which travels both vertically and horizontally. The stabilization system is similar to those shown in the previous embodiments but differs in that the stabilization chain guide 217 located at the inward curve of the L has a larger radius than the stabilization sprockets and is equal in radius to the conveyor sprockets located at the ends of the conveyor. Also, the conveyor sprocket 207 at this location is smaller in radius than the other conveyor sprockets and has the same radius as the stabilization sprockets at the ends of the conveyor. In this embodiment, as in the previously described embodiments, the radius of the carrier sprocket 225 which engages the stabilization chain is equal to the difference in the radius of the conveyor sprocket and the radius of the stabilization sprocket or chain guide. As can be seen in FIGURE 6, this relationship exists even where the stabilization means are larger than the conveyor sprockets as in the case of stabilization chain guides 217 and conveyor sprockets 207. Because this relationship exists both when the conveyor sprockets are larger than the stabilization means and vice versa, the arcuate speed of the carrier units 221 around the conveyor sprockets will vary at a proper rate to maintain the carriers level even though the conveyor sprocket 207 is smaller than the other conveyor sprockets.

It will be appreciated that level rotation may be desired only around one set of conveyor stabilization sprockets whereas any kind of rotation is tolerable around the opposed set. In such a case, the effective circumferential engagement of the carrier sprocket need equal the difference in the effective circumferential engagement of the stabilization and conveyor sprockets at only one end. It need not equal such difference at the other end. All these variations will understandably operate within the scope of the present invention.

The foregoing invention can now be practiced, and such practitioners will know that the invention is not necessarily restricted to the particular embodiment presented herein. The scope of the invention is to be defined by the terms of the following claims as given meaning by the preceding description.

I claim:
1. In an endless conveyor having a set of upper and lower conveyor sprockets, a pair of spaced sprocket chains rotatively driven around said upper and lower conveyor sprockets, a plurality of carriers pivotally held between said spaced sprocket chains, a stabilization system which includes at least one endless stabilization chain, a set of upper and lower rotatable stabilization sprockets for each stabilization chain, the stabilization sprockets being of smaller diameter than the conveyor sprockets, a carrier sprocket non-rotatively fixed to each carrier, the carrier sprocket meshing with the stabilization chain, and said carrier sprocket and carrier being together rotated a predetermined amount during arcuate transit around the conveyor sprockets, whereby the carriers are maintained substantially level throughout their passage on the endless conveyor.

2. In an endless conveyor as in claim 1 further characterized in that a pair of stabilization chains are provided and a carrier sprocket is non-rotatively fixed to each end of each carrier so that each carrier sprocket may engage an adjoining stabilization chain.

3. In an endless conveyor as in claim 1 further characterized in that said stabilization system is directly driven at differential speeds so that the linear speed of the stabilization chain is equivalent to the linear speed of the conveyor chain, but the speed of said stabilization chain exceeds the speed of the conveyor chain in arcuate transit so that said carrier sprocket and carrier may be rotated at a predetermined amount during arcuate transit.

4. In a endless conveyor as in claim 1 further characterized in that said stabilization chain which is rotatable around said upper and lower stabilization sprockets includes a two part sprocket chain, one of said parts being engageable by and rotatable around said set of stabilization sprockets, and said other part turning with said first part, said other part being further adapted to engage a carrier sprocket without interference.

5. The structure of claim 1 further characterized in that said upper and lower stabilization sprockets are positioned respectively next to upper and lower conveyor sprockets, and means are provided to drive the stabilization chain so that the linear speed of said stabilization chain is equal to the linear speed of the conveyor chains.

6. In an endless conveyor as in claim 5 further characterized by and including means for indirectly driving said stabilization chain so that the linear speed of said stabilization chain is equivalent to the linear speed of said conveyor chain, said means including bearing means on the carrier, a stationary element adjoining said stabilization chain, and said bearing means adapted to engage said stationary element during linear transit, whereby lateral deflection of said carrier is restrained and driving forces are transmitted from said conveyor chain to said stabilization chain.

7. In an endless conveyor as in claim 5 further characterized in that said stabilization chain includes a two part sprocket chain, one of said parts being engageable by and rotatable around said set of stabilization sprockets, and said other part turning with said first part, said other part being further adapted to engage the carrier sprocket without interference.

8. The structure of claim 5 further characterized in that a pair of stabilization chains are provided, a carrier sprocket is non-rotatively fixed to each end of each carrier so that each carrier sprocket may engage an adjoining stabilization chain, said stabilization sprockets are of equal diameter, and separate means are provided for driving the conveyor chains.

9. In an endless conveyor as in claim 8 further characterized in that each of said stabilization chains includes a two part sprocket chain, one of said parts being engageable by and rotatable around a set of stabilization sprockets and said other part turning with said first part, said other part being further adapted to engage a carrier sprocket without interference.

10. The structure of claim 2 further characterized in that each set of stabilization sprockets has an upper stabilization sprocket concentrically positioned with an upper conveyor sprocket and a lower stabilization sprocket concentrically positioned with a lower conveyor sprocket, the stabilization sprockets being of substantially equal diameter, said carrier sprocket having an effective circumferential meshing surface equivalent to the difference of the effective circumferential meshing surfaces of the conveyor sprocket and the stabilization sprocket, each carrier sprocket indirectly driving said stabilization chains as their attached carriers are driven by the conveyor chains, and said predetermined amount of rotation of said carrier sprocket and carrier being established by the greater speed of the stabilization chain turning around the stabilization sprocket relative to the speed of the conveyor chain turning around the conveyor sprocket.

11. The structure of claim 10 further characterized in that said stabilization chain includes a two part sprocket chain, one of said parts being engageable by and rotatable around said set of stabilization sprockets, and said other part turning with said first part, said other part being further adapted to engage a carrier sprocket without interference.

12. The structure of claim 10 further characterized by and including a roller connected to each carrier and a substantially linear guide rail adjoining the sprocket chain in the area of linear travel, the roller adapted to contact the guide rail to maintain the carrier in linear transit without substantial horizontal lateral deflection whereby the engagement of the roller with the guide rail cooperatively transmit driving force from the conveyor chain to a stabilization chain.

13. An endless conveyor with a stabilization system to prevent lateral deflection of carriers in their arcuate passage, which includes, in combination, a supporting frame, a set of conveyor sprockets at one end of the frame, a set of conveyor sprockets at the opposed end of the frame, a conveyor sprocket in one set aligned with a conveyor sprocket in the other set, endless conveyor chains turning around the aligned conveyor sprocket in the sets, a plurality of carriers pivotally connected between the endless conveyor chains, means to turn the conveyor chains and the pivotally connected carriers at a selected speed around the endless conveyor, a stabilization system turning with the conveyor chains, said stabilization system having an upper set of stabilization sprockets and a lower set of stabilization sprockets, a stabilization sprocket in the upper set aligned with a stabilization sprocket in the lower set, stabilization chains turning around each pair of aligned stabilization sprockets in the sets, said stabilization chains turning around each of said aligned stabilization sprockets including a first chain adaptable to engage said stabilization sprocket and a second chain fixed to said first chain, the stabilization sprockets being smaller and concentrically positioned with the conveyor sprockets, separate means to turn the stabilization chains at a differential rate relative to the conveyor chains so that the stabilization chain moves at the same speed as the conveyor chain during linear transit, a carrier sprocket non-rotatively fixed to each end of each carrier, said carrier sprocket gear adapted to mesh with said second chain of each set of stabilization chains as the carrier moves around the endless conveyor, and the effective circumferential engagement of said non-rotatively fixed carrier sprockets being equal to the difference of the effective circumferential engagements of the stabilization sprockets and the conveyor sprockets, whereby the carrier sprocket and its carrier non-rotatively move in linear transit but rotate a predetermined amount in arcuate transit so that the carrier is maintained substantially level in its arcuate transit around both ends of the endless conveyor.

14. An endless conveyor with a stabilization system to prevent lateral deflection of carriers in their arcuate passage which includes, in combination, a supporting frame, a set of conveyor sprockets at one end of the frame, a set of conveyor sprockets at the opposed end of the frame, a conveyor sprocket in one set aligned with a conveyor sprocket in the other set, endless conveyor chains turning around aligned conveyor sprockets in the sets, a plurality of carriers pivotally connected between the endless conveyor chains, means to turn the conveyor chains and the pivotally connected carriers at a selected speed around the endless conveyor, a stabilization system having an upper set of stabilization sprockets and a lower set of stabilization sprockets, a stabilization sprocket in the upper set aligned with a stabilization sprocket in the lower set, stabilization chains turning around the aligned stabilization sprockets in the sets, said stabilization chains turning around each of said aligned stabilization sprockets including a first chain adapted to engage said stabilization sprocket and a second chain fixed to said first chain, the stabilization sprockets being smaller and concentrically positioned with the conveyor sprockets, a carrier sprocket non-rotatively fixed to each end of each carrier, an elongated stationary element on the frame adjoining the stabilization chain along the vertical path of travel, bearing means on each carrier adapted to contact said stationary element during linear travel of the carrier, said carrier sprocket adapted to mesh with said second chain and drive the stabilization chains during linear travel while the bearing means are in contact with said stationary element, said non-rotatively fixed carrier sprocket terminating its driving operation during arcuate passage around the endless conveyor, and the effective circumferential engagement of each non-rotatively fixed carrier sprocket being equal to the difference of the effective circumferential engagements of the stabilization sprocket and the conveyor sprockets, whereby the carrier sprocket and its carrier non-rotatively move in linear transit but rotate a predetermined amount in arcuate transit so that the carrier is maintained substantially level in its arcuate transit around both ends of the carrier 15. In an endless conveyor having spaced sets of conveyor sprockets, spaced sprocket chains rotatively driven around said sets of sprockets, a plurality of carriers pivotally fixed between said sprocket chains, a stabilization system which includes spaced sets of stabilization sprockets, an endless stabilization chain rotatively driven around said spaced sets of stabilization sprockets, said conveyor sprockets and said stabilization sprockets having different diameters, a carrier sprocket non-rotatively fixed to each carrier, said carrier sprocket adapted to mesh with said stabilization chain, said carrier sprocket further having a diameter equal to the difference between the diameter of a conveyor sprocket and the diameter of a stabilization sprocket, and means to drive the conveyor chains and the stabilization chains at the same speed in linear transit so that the arcuate speed of the chains around their respective sprockets will vary to rotate the carrier sprockets sufficiently to maintain the stability of the carriers when the carriers pass around the conveyor sprockets.

16. The structure of claim 13 further characterized in that said conveyor follows a generally L-shaped path with one leg of the L extending generally horizontally and the other leg extending generally vertically, and a set of conveyor sprockets and a set of stabilization means are positioned on each side of the conveyor at the intersection of the legs of the L with the stabilization means on the inside of the L having larger radii than their associated conveyor sprockets.

17. The structure of claim 14 further characterized in that said conveyor follows a generally L-shaped path with one leg of the L extending generally horizontally and the other leg extending generally vertically, and a set of conveyor sprockets and a set of stabilization means are positioned on each side of the conveyor at the intersection of the legs of the L with the stabilization means on the inside of the L having larger radii than their associated conveyor sprockets.

References Cited

UNITED STATES PATENTS

| | | | |
|---|---|---|---|
| 1,194,932 | 8/1916 | Baker | 198—137 |
| 1,592,069 | 7/1926 | Benson | 198—137 |

ANDRES H. NIELSEN, *Primary Examiner.*

RICHARD E. AEGERTER, *Examiner.*